United States Patent
Chen et al.

(10) Patent No.: US 10,999,076 B2
(45) Date of Patent: May 4, 2021

(54) FLIGHT DATA EXCHANGING, TRANSMITTING, AND RECEIVING METHOD AND SYSTEM, MEMORY, AND AERIAL VEHICLE

(71) Applicant: SZ DJI TECHNOLOGY CO., LTD., Shenzhen (CN)

(72) Inventors: Yongsen Chen, Shenzhen (CN); Ming Gong, Shenzhen (CN); Ming Chen, Shenzhen (CN); Zhun Ding, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 245 days.

(21) Appl. No.: 16/003,698

(22) Filed: Jun. 8, 2018

(65) Prior Publication Data

US 2018/0295110 A1    Oct. 11, 2018

Related U.S. Application Data

(63) Continuation of application No. PCT/CN2015/097070, filed on Dec. 10, 2015.

(51) Int. Cl.
| | |
|---|---|
| H04L 9/32 | (2006.01) |
| H04L 29/08 | (2006.01) |
| H04W 12/00 | (2021.01) |
| H04W 12/10 | (2021.01) |
| H04W 12/06 | (2021.01) |

(Continued)

(52) U.S. Cl.
CPC .......... *H04L 9/3226* (2013.01); *H04L 9/3247* (2013.01); *H04L 63/0428* (2013.01); *H04L 63/0442* (2013.01); *H04L 63/126* (2013.01); *H04L 67/12* (2013.01); *H04L 67/20* (2013.01); *H04L 69/40* (2013.01); *H04W 12/001* (2019.01); *H04W 12/06* (2013.01); *H04W 12/1008* (2019.01); *H04L 2209/80* (2013.01); *H04L 2209/84* (2013.01)

(58) Field of Classification Search
CPC .................................................. H04L 63/0442
See application file for complete search history.

(56) References Cited

U.S. PATENT DOCUMENTS

| | | | |
|---|---|---|---|
| 8,958,561 B2 | 2/2015 | Stroud | |
| 2011/0299681 A1* | 12/2011 | Kubota | ............. H04W 12/0017 380/247 |

(Continued)

FOREIGN PATENT DOCUMENTS

| | | |
|---|---|---|
| CN | 1571299 A | 1/2005 |
| CN | 101847271 A | 9/2010 |

(Continued)

OTHER PUBLICATIONS

The World Intellectual Property Organization (WIPO) International Search Report for PCT/CN2015/097070 dated Sep. 5, 2016 9 Pages (including translation).

*Primary Examiner* — Kevin Bechtel
*Assistant Examiner* — Suman Debnath
(74) *Attorney, Agent, or Firm* — Anova Law Group, PLLC (57) ABSTRACT

A flight data exchanging method includes receiving a control instruction for transmitting flight data of an aerial vehicle, encrypting the flight data, transmitting the flight data to a server, and receiving a transmission status of the flight data from the server.

18 Claims, 7 Drawing Sheets

(51) Int. Cl.
  *H04L 29/14*  (2006.01)
  *H04L 29/06*  (2006.01)

(56) References Cited

U.S. PATENT DOCUMENTS

2013/0125204 A1* 5/2013 La Fever ............ H04L 63/0876
                                                          726/2
2015/0067352 A1   3/2015 Winslow
2017/0045884 A1*  2/2017 Kablaoui ............ G05D 1/0022

FOREIGN PATENT DOCUMENTS

| CN | 104468122 A | 3/2015 |
| CN | 104950906 A | 9/2015 |
| CN | 104994112 A | 10/2015 |
| CN | 105109672 A | 12/2015 |
| JP | 3674534 B2 | 7/2005 |

* cited by examiner

FLIGHT DATA EXCHANGING, TRANSMITTING, AND RECEIVING METHOD AND SYSTEM, MEMORY, AND AERIAL VEHICLE

CROSS-REFERENCE TO RELATED APPLICATION

This application is a continuation application of International Application No. PCT/CN2015/097070, filed on Dec. 10, 2015, the entire contents of which are incorporated herein by reference.

TECHNICAL FIELD

The present disclosure relates to communication control or industrial control type application programs and, more particularly, to a flight data exchanging, transmitting, and receiving method and system, a memory, and an aerial vehicle.

BACKGROUND

With the development of science and technology, unmanned aerial vehicles are increasingly adopted in people's daily life. To ensure the normal and legitimate operations of the aerial vehicles, people often manage the aerial vehicles through an aerial vehicle regulatory platform. When an aerial vehicle executes a flying task, flight data may be uploaded to the aerial vehicle regulatory platform. The existing aerial vehicle regulatory platform and data exchange system provides little or no security during the transmission of the flight data. Thus, the flight data exchanging is insecure and unauthorized parties can access or tamper the flight data.

SUMMARY

In accordance with the disclosure, there is provided a flight data exchanging method including receiving a control instruction for transmitting flight data of an aerial vehicle, encrypting the flight data, transmitting the flight data to a server, and receiving a transmission status of the flight data from the server.

Also in accordance with the disclosure, there is provided an aerial vehicle including a functional component and an aerial vehicle controller coupled to the functional component. The aerial vehicle controller includes a processor configured to receive a control instruction for transmitting flight data of the aerial vehicle, encrypt the flight data, and transmit the flight data to a server.

| Description of main reference numerals | |
|---|---|
| Flight data exchanging system | S1, S4 |
| Processing circuit | 10 |
| Encryption sub-circuit | 12 |
| Decryption sub-circuit | 14 |
| Verification sub-circuit | 16 |
| Feedback sub-circuit | 18 |
| Data transmitting control circuit | 30, 410 |
| Data receiving control circuit | 50, 430 |
| Aerial vehicle | 100 |
| First memory | 110 |
| First processor | 130 |
| First data transmitter | 150 |
| First data receiver | 170 |
| Storage terminal | 200 |
| Second memory | 210 |
| Second processor | 230 |
| Second data transmitter | 250 |
| Second data receiver | 270 |
| Control terminal | 300 |
| Controller | 330 |
| Data transceiver | 350 |
| Processing sub-circuit | 412 |
| First encryption sub-circuit | 414 |
| Transmitting sub-circuit | 416 |
| First receiving sub-circuit | 432 |
| First verification sub-circuit | 434 |
| First decryption sub-circuit | 436 |
| Feedback sub-circuit | 438 |
| Feedback circuit | 450 |
| Second encryption sub-circuit | 452 |
| Second receiving sub-circuit | 453 |
| Second verification sub-circuit | 454 |
| Second decryption sub-circuit | 456 |
| Marking sub-circuit | 458 |

Embodiments of the present disclosure will be described in detail with reference to the accompanying drawings.

DETAILED DESCRIPTION OF THE EMBODIMENTS

Technical solutions of the present disclosure will be described with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

Unless otherwise defined, all the technical and scientific terms used herein have the same or similar meanings as generally understood by one of ordinary skill in the art. As described herein, the terms used in the specification of the present disclosure are intended to describe example embodiments, instead of limiting the present disclosure. The term "and/or" used herein includes any suitable combination of one or more related items listed.

The present disclosure provides a flight data exchanging method, which can be applied to both an aerial vehicle and a server to facilitate the aerial vehicle to upload flight data to the server. The flight data exchanging method may include receiving a data transmitting instruction, controlling the aerial vehicle to encrypt the flight data, transmitting the flight data, controlling the sever to receive the flight data, generating a transmission status of the flight data, and controlling the server to return the transmission status to the aerial vehicle.

The present disclosure also provides a flight data exchanging system, including a processing circuit configured to receive data transmitting instructions, a data transmitting control circuit configured to transmit the flight data, and a data receiving control circuit configured to receive the flight data. The processing circuit may include an encryption sub-circuit configured to encrypt the flight data. The processing circuit may also include a feedback sub-circuit configured to generate a transmission status of the flight data. The data transmitting control circuit may also control the server to return the transmission status back to the aerial vehicle.

The present disclosure also provides an aerial vehicle regulatory platform, including a processing circuit configured to receive data transmitting instructions, a data transmitting control circuit configured to transmit the flight data, and a data receiving control circuit configured to control the server to receiving the flight data. The processing circuit may include an encryption sub-circuit configured to encrypt the flight data. The processing circuit may also include a feedback sub-circuit configured to generate a transmission status of the flight data. The data transmitting control circuit may also control the server to return a transmission status back to the aerial vehicle.

The present disclosure also provides a flight data transmitting method, which facilitates an aerial vehicle to upload flight data to a server. The flight data transmitting method may include receiving a data transmitting instruction, encrypting the flight data, and transmitting the flight data.

The present disclosure also provides a flight data transmitting system, which facilitates an aerial vehicle to upload flight data to a server. The flight data transmitting system may include a processing sub-circuit configured to receive data transmitting instructions, an encryption sub-circuit configured to encrypt the flight data, and a transmitting sub-circuit configured to transmit the flight data.

The present disclosure also provides an aerial vehicle controller, which facilitates an aerial vehicle to upload flight data to a server. The aerial vehicle controller may include a control terminal, and a processor configured to receive data transmitting instructions, encrypt the flight data, and transmit the flight data.

The present disclosure also provides an aerial vehicle, including a plurality of functional components. The plurality of the functional components may facilitate an aerial vehicle to upload flight data to a server through an aerial vehicle controller. The aerial vehicle controller may include a control terminal, and a processor configured to receive data transmitting instructions, encrypt the flight data, and transmit the flight data.

The present disclosure also provides a flight data receiving method, which controls a server to receive flight data from an aerial vehicle. The flight data receiving method may include receiving encrypted flight data, and decrypting and storing the flight data.

The present disclosure also provides a flight data receiving system, which controls a server to receive flight data from an aerial vehicle. The flight data receiving system may include a receiving sub-circuit configured to receive encrypted flight data and a decryption sub-circuit configured to decrypt the flight data. The receiving sub-circuit may also store the flight data.

The present disclosure also provides a flight data management system for managing flight data of an aerial vehicle. The flight data management system may include a control terminal, and a processor configured to receive encrypted flight data, and decrypt and store the flight data.

The present disclosure also provides a memory storing program instructions. The program instructions may be obtained and by a processor to receive encrypted flight data, and decrypt and store the flight data.

Example embodiments will be described in detail with reference to the accompanying drawings. The embodiments described below and/or features thereof can be combined as needed, unless they conflict with each other.

Figure 1:
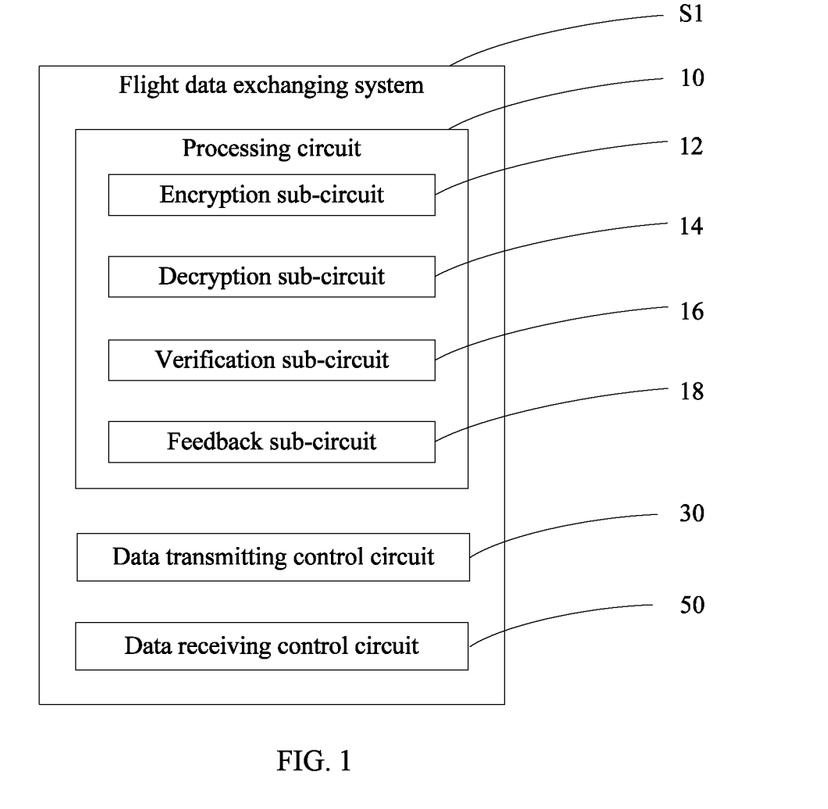
FIG. 1 is a schematic structural diagram of a flight data exchanging system according to an example embodiment.
Figure 2:
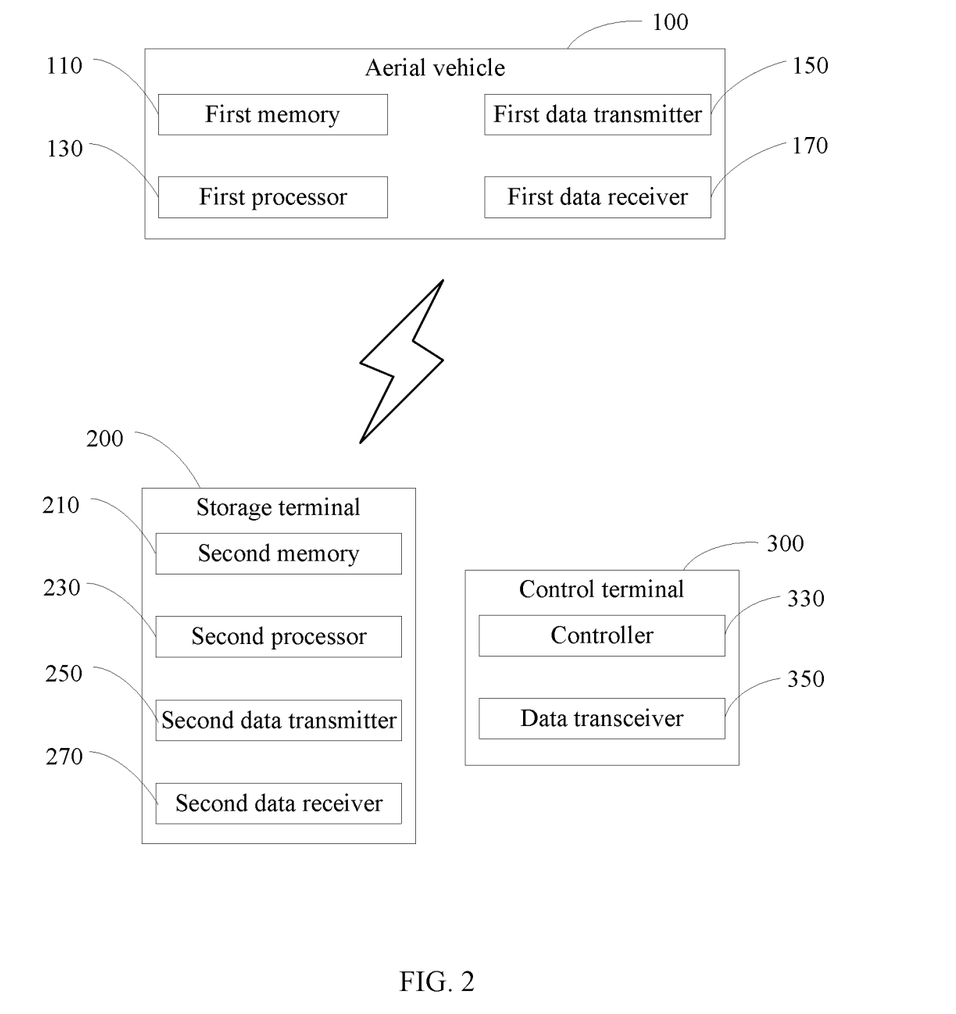
FIG. 2 is a schematic diagram of an example operation environment of the flight data exchanging system in FIG. 1.

FIG. 1 is a schematic structural diagram of a flight data exchanging system S1 according to an example embodiment. FIG. 2 is a schematic diagram of an example operation environment of the flight data exchanging system in FIG. 1. The flight data exchanging system S1 in FIG. 1 may operate in the environment shown in FIG. 2. As shown in FIG. 2, the operation environment includes an aerial vehicle 100, a control terminal 300, and a storage terminal 200. The flight data of the aerial vehicle 100 may be sent to the storage terminal 200, where the flight data may be archived or managed. The example operation environment shown in FIG. 2 is illustrative and an operation environment consistent with the disclosure can include other devices. For example, the operation environment can include a mobile terminal, and the aerial vehicle 100 can be an example of the mobile terminal. As another example, the storage terminal 200 may include a server or be a part of a server, where the server can include an aerial vehicle regulatory platform.

In some embodiments, the aerial vehicle 100 may be an unmanned aerial vehicle.

In some embodiments, the flight data exchanging system S1 may be an aerial vehicle regulatory system. The aerial vehicle regulatory system may receive and store flight data of the aerial vehicle for the purpose of regulating the flight behavior of the aerial vehicle. The flight data may include, but is not limited to, the aerial vehicle's GPS location information, flight time, flight altitude, flight speed, flight route, and flight attitude. In some embodiments, the storage terminal 200 may include an aerial vehicle regulatory platform and the control terminal 300 may include a remote controller for the aerial vehicle 100. The aerial vehicle regulatory system may operate on the aerial vehicle regulatory platform, the remote controller, and/or the aerial vehicle 100. In some embodiments, the control terminal 300 may be arranged at the aerial vehicle 100. That is, the control terminal 300 may be a component of the aerial vehicle 100 for controlling the operation of the aerial vehicle 100. The control terminal 300 may control the aerial vehicle 100 to upload the flight data to the storage terminal 200 and control the storage terminal 200 to return a status of the flight data transmission to the aerial vehicle 100. The aerial vehicle 100 may transmit encrypted flight data to the storage terminal 200 and mark the corresponding flight data based on the transmission status thereof. The storage terminal 200 may receive and store the flight data and return the status of the flight data transmission to the aerial vehicle 100.

As shown in FIG. 1, the flight data exchanging system S1 includes a processing circuit 10, a data transmitting control circuit 30, and a data receiving control circuit 50. The processing circuit 10 may process, encrypt, and decrypt the flight data. The data transmitting control circuit 30 may control the aerial vehicle 100 to transmit the flight data and control the storage terminal 200 to transmit the transmission status of the flight data. The data receiving control circuit 50 may control the aerial vehicle 100 to receive the transmission status of the flight data and control the storage terminal 200 to receive the flight data.

FIG. 2 shows functional components of the aerial vehicle 100, the storage terminal 200, and the control terminal 300 according to disclosed embodiments. The aerial vehicle 100 includes a first memory 110, a first processor 130, a first data transmitter 150, and a first data receiver 170.

The first memory 110 may store the flight data and identification information of the aerial vehicle 100 (also referred to as an "aerial vehicle ID" for short). In some embodiments, the first memory 110 may store a password, an encryption key, and other desired information to encrypt and/or decrypt the flight data and the transmission status of the flight data. In some embodiments, the password, the encryption key, and the other desired information may include an encryption password to encrypt the flight data, a private encryption key for the aerial vehicle 100 (also referred to as an "aerial vehicle private key"), and a public encryption key for the storage terminal 200 (also referred to as a "storage terminal public key").

The aerial vehicle ID may be an identification code of the aerial vehicle 100, which includes specific information for identifying the aerial vehicle 100, such as an aerial vehicle serial number. The aerial vehicle ID may uniquely identify the aerial vehicle 100. The aerial vehicle ID may be burned into a controller of the aerial vehicle 100 ex-factory. Every aerial vehicle may have a unique aerial vehicle ID. The aerial vehicle ID may be stored in the storage terminal 200, such that the storage terminal 200 may verify the origin of the flight data using the aerial vehicle ID.

The encryption password may encrypt the flight data to ensure the security and confidentiality of the flight data during the transmission and to prevent unauthorized access and tampering of the flight data during the transmission. The encryption password may also be stored in the storage terminal 200 to allow the storage terminal 200 to decrypt the flight data.

The aerial vehicle private key may append signature information of the aerial vehicle 100 to the flight data by digitally signing the encrypted flight data, such that the authenticity of the flight data may be ensured and flight data forgery may be prevented. The aerial vehicle private key may be used in combination with an aerial vehicle public key. The aerial vehicle public key may be stored in the storage terminal 200 to authenticate the aerial vehicle private key. Obtained through an asymmetrical encryption algorithm, the aerial vehicle private key and the aerial vehicle public key may be unique and unable to replicate. Thus, the authenticity and security of the flight data may be ensured.

The aerial vehicle private key and the aerial vehicle public key may be burned into the controller of the aerial vehicle 100 ex-factory or may be entered by a user into the controller of the aerial vehicle 100 in a safe environment prior to commissioning the aerial vehicle 100. For example, before a user uses the aerial vehicle 100 for the first time, the user may configure security settings in the aerial vehicle 100. Based on the user manual of the aerial vehicle 100, the user may provision the aerial vehicle private key and the aerial vehicle public key into the controller of the aerial vehicle 100. When the aerial vehicle 100 is used and implemented with the flight data exchanging system S1, the aerial vehicle 100 may dispatch the aerial vehicle public key to relevant storage terminal 200 as needed.

The storage terminal public key may be a public key dispatched by the storage terminal 200 to the aerial vehicle 100 for authenticating the storage terminal 200. The aerial vehicle 100 may authenticate the digital signature in the transmission status returned by the storage terminal 200. In some embodiments, the storage terminal public key may be used in combination with a storage terminal private key. The storage private key may be stored in the storage terminal 200 to digitally sign the transmission status, thereby ensuring the authenticity of the transmission status.

The first memory 110 may include a computer-readable storage medium, such as, for example, a USB flash drive, a removable hard disk, a read-only memory (ROM), a random access memory (RAM), a magnetic disk, a CD-ROM, or another medium that can store program codes.

The first processor 130 may encrypt the flight data of the aerial vehicle 100, and authenticate and decrypt the transmission status. In some embodiments, after the first processor 130 receives a control instruction for transmitting the flight data, the first processor 130 may obtain a random code through calculation, and append the random code to the flight data to form a flight data packet. The first processor 130 may encrypt the flight data packet using an encryption password, digitally sign the encrypted flight data packet using the aerial vehicle private key, and append an aerial vehicle ID to the flight data packet. After the aerial vehicle 100 receives a transmission status returned by the storage terminal 200, the first processor 130 may authenticate the digital signature in the transmission status using the storage public key, and mark the corresponding flight data based on the transmission status.

The first processor 130 may include a central processing unit (CPU), a microprocessor, or another data processing chip.

The first data transmitter 150 may transmit the flight data packet that is encrypted, digitally signed, and carrying the aerial vehicle ID.

The first data receiver 170 may receive the transmission status returned by the storage terminal 200.

The storage terminal 200 includes a second memory 210, a second processor 230, a second data transmitter 250, and a second data receiver 270.

The second memory 210 may store the flight data uploaded by the aerial vehicle 100, the aerial vehicle ID, the encryption password, the aerial vehicle public key, and the storage terminal private key. The storage terminal 200 may digitally sign the transmission status using the storage terminal private key.

The second processor 230 may verify the authenticity of the flight data packet and return a transmission status. In some embodiments, after the storage terminal 200 receives the flight data packet, the second processor 230 may match and verify the aerial vehicle ID carried by the flight data packet to determine an origin of the flight data packet. The second processor 230 may verify the authenticity of the aerial vehicle private key using the aerial vehicle public key, decrypt the flight data packet, and generate a transmission status based on the determination, verification, and/or decryption result. The second processor 230 may also digitally sign the transmission status using the storage terminal private key. In some embodiments, before the second processor 230 digitally signs the transmission status, the second processor 230 may encrypt the transmission status to ensure the security of the transmission status when the transmission status is returned to the aerial vehicle. Correspondingly, the first memory 110 of the aerial vehicle 100 may store the corresponding decryption password, and the first processor 130 may decrypt the transmission status.

The second processor 230 may include a central processing unit (CPU), a microprocessor, or another data processing chip.

The second data transmitter 250 may transmit the encrypted and/or digitally signed transmission status to the aerial vehicle 100.

The second data receiver 270 may receive the flight data packet.

The control terminal 300 includes a controller 330 and a data transceiver 350.

The controller 330 may control the aerial vehicle 100 to transmit the flight data and/or receive the transmission status.

The data transceiver 350 may transmit a transmitting control instruction for transmitting the flight data, and/or a receiving control instruction for receiving the transmission status.

Referring again to FIG. 1, the flight data exchanging system S1 includes the processing circuit 10, the data transmitting control circuit 30, and the data receiving control circuit 50. In some embodiments, the functions of the circuits of the flight data exchanging system S1 may be implemented by program codes stored in a memory and executable by a corresponding processor. For example, the program codes implementing the function of the processing circuit 10 may be stored in the first memory 110 and/or the second memory 210 and may be executed by the first processor 130 and/or the second processor 230. The program codes implementing the function of the data transmitting control circuit 30 may be stored in the first memory 110 and/or the second memory 210 and may be executed by the first data transmitter 150 and/or the second data transmitter 250. The program codes implementing the function of the data receiving control circuit 50 may be stored in the first memory 110 and/or the second memory 210 and may be executed by the first data receiver 170 and/or the second data receiver 270.

In some embodiments, the processing circuit 10 may process, encrypt, and decrypt the flight data. The data transmitting control circuit 30 may control the aerial vehicle 100 and the storage terminal 200 to transmit the flight data and the transmission status. The data receiving control circuit 50 may control the aerial vehicle 100 and the storage terminal 200 to receive the transmission status and the flight data.

Details of various circuits of the flight data exchanging system S1 are described below.

After receiving a control instruction for transmitting the flight data, the processing circuit 10 may process, encrypt, and decrypt the flight data. As shown in FIG. 1, the processing circuit 10 includes an encryption sub-circuit 12, a decryption sub-circuit 14, a verification sub-circuit 16, and a feedback sub-circuit 18.

The encryption sub-circuit 12 may control the first processor 130 to encrypt the flight data. After a transmission status is generated, the encryption sub-circuit 12 may control the second processor 230 to encrypt and digitally sign the transmission status.

After the storage terminal 200 receives a flight data packet, the verification sub-circuit 16 may control the second processor 230 to verify the authenticity of the flight data packet. After the aerial vehicle 100 receives a transmission status, the verification sub-circuit 16 may control the first processor 130 to verify the reliability and authenticity of the origin of the transmission status.

The decryption sub-circuit 14 may control the second processor 230 to decrypt the flight data and store the decrypted flight data in the second memory 210. After the aerial vehicle 100 receives a transmission status, the decryption sub-circuit 14 may control the first processor 130 to decrypt the transmission status.

After the flight data is stored in the second memory 210, the feedback sub-circuit 18 may control the second processor 230 to generate the transmission status.

The data transmitting control circuit 30 may control the first data transmitter 150 to transmit the encrypted flight data and control the second data transmitter 250 to transmit the encrypted transmission status.

The data receiving control circuit 50 may control the first data receiver 170 to receive the transmission status and control the second data receiver 270 to receive the flight data.

The flight data exchanging system may encrypt the flight data using an encryption password to secure the flight data during the transmission, avoid the leaking of the flight data contents, and prevent the flight data from being intercepted or tampered during the transmission. In some embodiments, the flight data exchanging system may asymmetrically encrypt the flight data using the aerial vehicle private key and the aerial vehicle public key to further enhance the security and confidentiality of the flight data during the transmission. Moreover, digitally signing the flight data using the aerial vehicle private key may attach the authenticity to the flight data to prevent a third party from falsifying or forging the flight data. Due to its uniqueness and reliability, the asymmetrical encryption may further prevent the third party from intercepting or tampering the flight data, thereby making the flight data transmission secure and reliable. In addition, the flight data exchanging system may return the transmission status from the storage terminal to the aerial vehicle, such that the transmission status of the flight data may be recorded and the flight data management may be facilitated.

Figure 3:
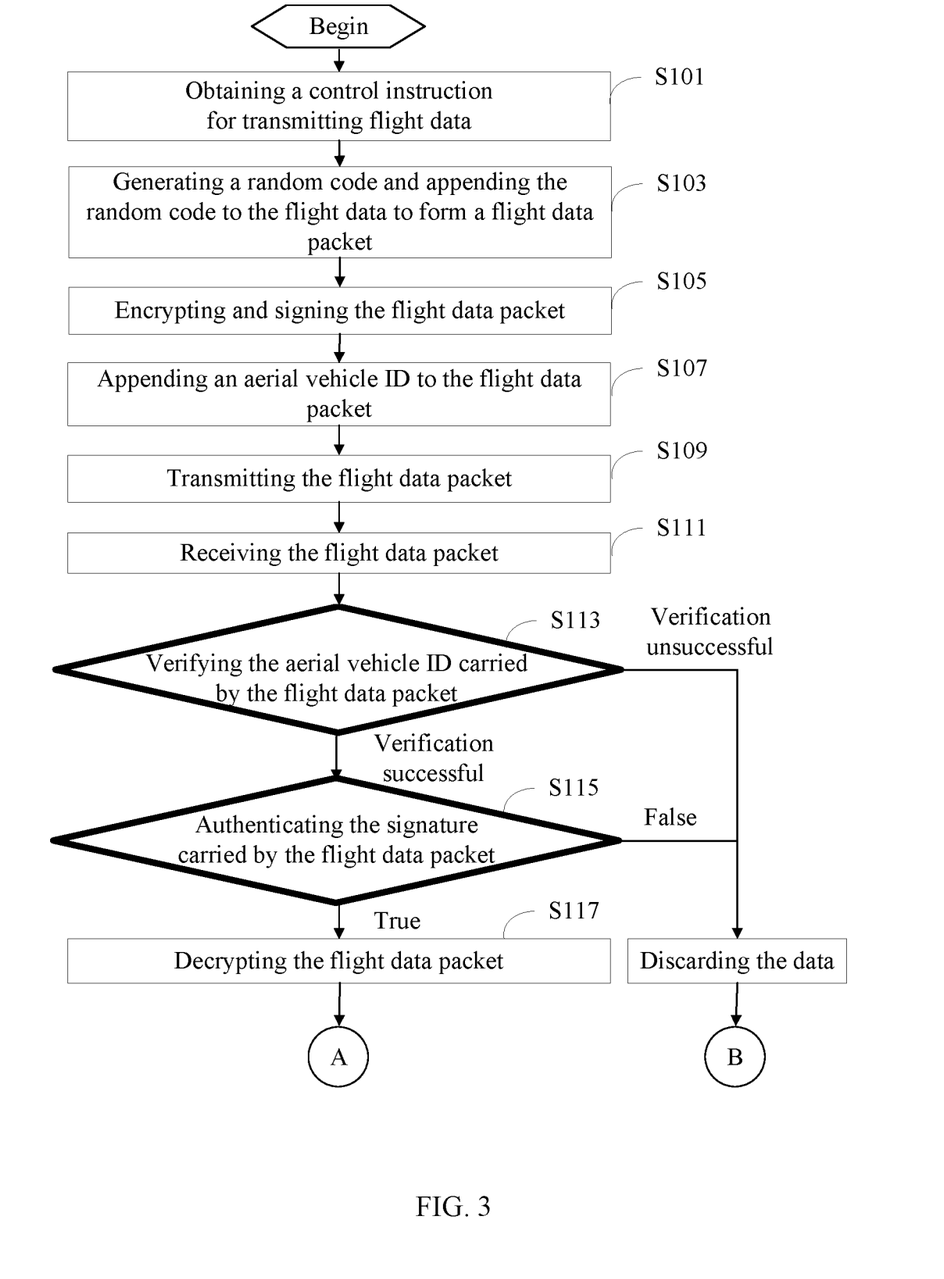
FIG. 3 and FIG. 4 show a flow chart of a flight data exchanging method according to an example embodiment.
Figure 4:
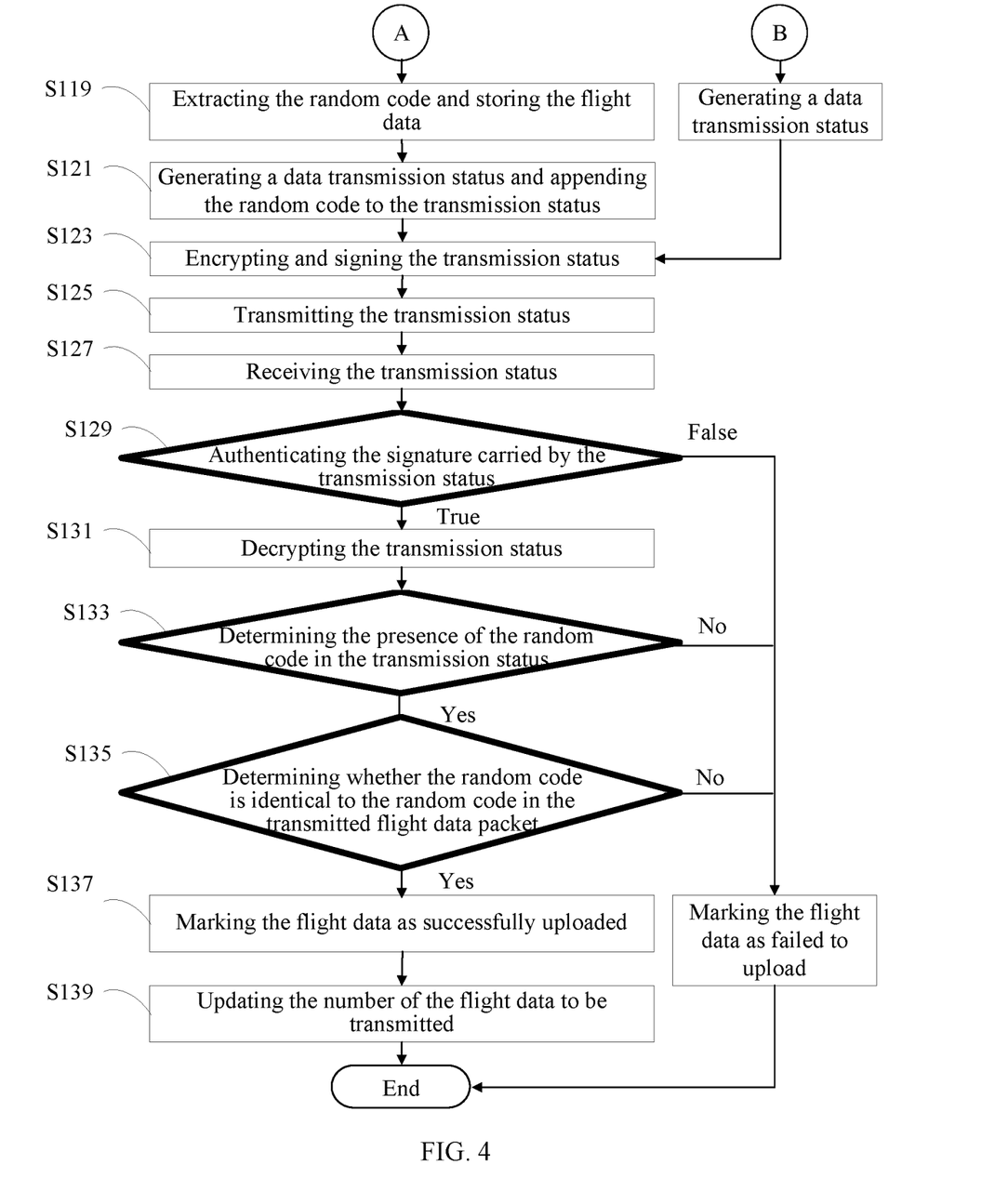

FIG. 3 and FIG. 4 show a flow chart of a flight data exchanging method according to an example embodiment. In some embodiments, the method consistent with the disclosure may be implemented by a processor. The processes and the sequence of the processes in the flow chart shown in FIG. 3 and FIG. 4 are intended to be illustrative, and not to limit the scope of the present disclosure. In some embodiments, one or more of the processes shown in FIG. 3 and FIG. 4 may be deleted and/or re-arranged, and/or additional process may be added.

In some embodiments, the flight data exchanging method may be applied to the flight data exchanging system S1 to exchange data between the aerial vehicle 100 and the storage terminal 200.

As shown in FIG. 3, at S101, a control instruction for transmitting flight data is obtained. In some embodiments, the processing circuit 10 may control the first processor 130 to obtain the control instruction for transmitting the flight data. The control instruction may be sent by the control terminal 300 or the storage terminal 200. Further, the control instruction may be generated by the aerial vehicle 100.

At S103, a random code is generated, and the random code is appended to the flight data to form a flight data packet. In some embodiments, the encryption sub-circuit 12 may control the first processor 130 to generate the random code, and to append the random code to the flight data to form the flight data packet. In some embodiments, the random code may be one of one or more pre-determined random codes stored in a random code database. The encryption sub-circuit 12 may generate the random code by randomly picking one from the random code database. The random code may include a combination of one or more digits, alphabets, and special characters. In some embodiments, the encryption sub-circuit 12 may generate the random code by using a pre-determined algorithm. The pre-determined algorithm may be any calculation formula preconfigured in the encryption sub-circuit 12. For example, specific information of the flight data (e.g., size of the data, flight time, flight altitude) may be substituted to the calculation formula to calculate the random code.

The random codes may be stored in the random code database. The encryption sub-circuit may generate the random code by randomly picking one from the random code database.

In some embodiments, generating the random code and appending the random code to the flight data to form the flight data packet (S103) may be omitted and S105 may be executed after the control instruction for transmitting the flight data is received (S101).

At S105, the flight data packet is encrypted, and a digital signature of the aerial vehicle 100 is appended to the flight data packet. In some embodiments, the encryption sub-circuit 12 may control the first processor 130 to encrypt the flight data packet and control the first processor 130 to append the digital signature of the aerial vehicle 100 to the flight data packet using the aerial vehicle public key. The flight data packet may be encrypted by using an encryption password. On the other hand, the storage terminal 200 may decrypt the flight data packet using the same encryption password. The encryption method is a symmetrical encryption algorithm.

In some embodiments, appending the digital signature of the aerial vehicle 100 at S105 can be omitted, and only encrypting the flight data packet is executed at S105.

In some embodiments, after the flight data packet is encrypted at S105, the encrypted flight data packet may be further encrypted using an authorization password obtained from the aerial vehicle 100 through the flight data calculation. In some embodiments, after the encryption sub-circuit 12 controls the first processor 130 to encrypt the flight data packet, the encryption sub-circuit 12 may further control the first processor 130 to encrypt the flight data packet using the authorization password obtained from the aerial vehicle 100 through the flight data calculation. The authorization password may be a message authentication code (MAC).

At S107, an aerial vehicle identification (also referred to as an "aerial vehicle ID") is appended to the flight data packet. In some embodiments, the encryption sub-circuit 12 may control the first processor 130 to append the aerial vehicle ID to the encrypted flight data packet.

In some embodiments, appending the aerial vehicle ID to the encrypted flight data packet (S107) may be omitted.

At S109, the flight data packet is transmitted. In some embodiments, the data transmitting control circuit 30 may control the first data transmitter 150 of the aerial vehicle 100 to transmit the flight data packet.

At S111, the flight data packet is received. In some embodiments, the data receiving control circuit 50 may control the second data receiver 270 of the storage terminal 200 to receive the flight data packet.

As shown in FIG. 3, at S113, the aerial vehicle ID carried by the flight data packet is verified. If the verification is successful, S115 is executed. If the verification is unsuccessful, a transmission status indicating transmission failure is generated, and S123 is executed (shown in FIG. 4). In some embodiments, when verifying the aerial vehicle ID, the verification sub-circuit 16 may control the second processor 230 to look up and match the aerial vehicle ID in the aerial vehicle IDs stored in the second memory 210. If the aerial vehicle ID carried by the flight data packet is found in the aerial vehicle IDs stored in the second memory 210, the match is successful, the verification is successful, and S115 is executed. If the aerial vehicle ID carried by the flight data packet is not found in the aerial vehicle IDs stored in the second memory 210, the match is unsuccessful, the flight data may be discarded, a transmission status indicating transmission failure is generated, and S123 is executed.

In some embodiments, when S107 is omitted, S113 may also be omitted.

At S115, the authenticity of the digital signature carried by the flight data packet is verified. If the digital signature is true, S117 is executed. If the digital signature is false, the transmission status indicating transmission failure is generated, and S123 is executed. In some embodiments, the verification sub-circuit 16 may control the second processor 230 to verify and decrypt the digital signature carried by the flight data packet using the aerial vehicle public key stored in the second memory 210. If the verification is successful, the digital signature carried by the flight data packet is authenticated, and S117 is executed. If the verification is unsuccessful, the digital signature carried by the flight data packet is not authenticated, the flight data may be discarded, the transmission status indicating transmission failure is generated, and S123 is executed.

In some embodiments, if the digital signature of the aerial vehicle 100 is not appended to the flight data packet at S105, S115 may be omitted.

In some embodiments, if the flight data packet is further encrypted using the authorization password after the flight data packet is encrypted at S105, verifying the digital signature may be omitted at S115, and the authorization password of the flight data packet may be decrypted. In some embodiments, the verification sub-circuit 16 may control the second processor 230 to decrypt the flight data by calculating the message authentication code (MAC). If the decryption is successful, S117 is executed. If the decryption is unsuccessful, the transmission status indicating transmission failure is generated, and S123 is executed.

At S117, the flight data packet is decrypted. In some embodiments, the decryption sub-circuit 14 may control the second processor 230 to decrypt the flight data using the encryption password.

At S119, a random code is extracted, and the flight data are stored. In some embodiments, the decryption sub-circuit 14 may control the second processor 230 to extract the random code from the flight data and store the flight data in the second memory 210.

At S121, a transmission status of the flight data is generated, and the random code is appended to the transmission status. In some embodiments, the feedback sub-circuit 18 may control the second processor 230 to generate the transmission status indicating transmission success and to append the random code to the transmission status.

At S123, the transmission status is encrypted, and a digital signature of the storage terminal 200 is appended to the transmission status. In some embodiments, the encryption sub-circuit 12 may control the second processor 230 to encrypt the transmission status and control the second processor 230 to append the digital signature of the storage terminal 200 to the transmission status using the aerial vehicle public key. The transmission status may be encrypted by an encryption password. The encrypted transmission status may be decrypted by the aerial vehicle 100 using the same encryption password. The encryption method may be a symmetrical algorithm.

In some embodiments, the transmission status may be encrypted without appending the digital signature of the storage terminal 200 to the transmission status in S123.

In some embodiments, after the transmissions status is encrypted at S123, the transmission status may be further encrypted using an authorization password obtained by the storage terminal 200 through the transmission status calculation. In some embodiments, after the encryption sub-circuit 12 controls the second processor 230 to encrypt the transmission status, the encryption sub-circuit 12 may further control the second processor 230 to further encrypt the transmission status using the authorization password obtained by the storage terminal 200 through the transmission status calculation. The authorization password may include a message authentication code (MAC).

At S125, the transmission status is transmitted. In some embodiments, the data transmitting control circuit 30 may control the second data transmitter 250 of the aerial vehicle 100 to transmit the transmission status.

At S127, the transmission status is received. In some embodiments, the data receiving control circuit 50 may control the first data receiver 170 of the aerial vehicle 100 to receive the transmission status.

At S129, the authenticity of the digital signature carried by the transmission status is verified. If the digital signature is true, S131 is executed. If the digital signature is false, the feedback sub-circuit 18 may control the first processor 130 to mark the corresponding flight data as failed to upload, and the process may end. In some embodiments, the verification sub-circuit 16 may control the first processor 130 to authenticate and decrypt the digital signature carried by the transmission status using the storage terminal public key stored in the first memory 110. If the verification is successful, the digital signature carried by the transmission status may be authenticated, and S131 is executed. If the verification is unsuccessful, the digital signature carried by the transmission status may not be authenticated, the feedback sub-circuit 18 may control the first processor 130 to mark the corresponding flight data as failed to upload, and the process may end.

In some embodiments, if the digital signature of the storage terminal 200 is not appended to the transmission status at S123, S129 may be omitted.

In some embodiments, if the transmission status is further encrypted using an authorization password obtained from the storage terminal 200 through the transmission status calculation after the transmissions status is encrypted at S123, verifying the authenticity of the digital signature at S129 may be omitted and the transmission status may be decrypted using the authorization password. In some embodiments, the verification sub-circuit 16 may control the first processor 130 to decrypt the transmission status by calculating the message authentication code (MAC). If the decryption is successful, S131 is executed. If the decryption is unsuccessful, the feedback sub-circuit 18 may control the first processor 130 to mark the corresponding flight data as failed to upload, and the process may end.

At S131, the transmission status is decrypted. In some embodiments, the decryption sub-circuit 14 may control the first processor 130 to decrypt the transmission status using the encryption password.

At S133, the presence of the random code in the transmission status is determined. If the random code is present, S135 is executed. If the random code is absent, the feedback sub-circuit 18 may control the first processor 130 to mark the corresponding flight data as failed to upload, and the process may end. In some embodiments, the decryption sub-circuit 14 may control the first processor 130 to determine the presence of the random code in the transmissions status. If the random code is present, S135 is executed. If the random code is absent, the feedback sub-circuit 18 may control the first processor 130 to mark the corresponding flight data as failed to upload, and the process may end.

At S135, the random code is extracted and whether the extracted random code is identical to the random code in the transmitted flight data packet is determined. If the random code extracted from the transmission status is identical to the random code in the transmitted flight data packet, S137 is executed. If the random code extracted from the transmission status is not identical to the random code in the transmitted flight data packet, the feedback sub-circuit 18 may control the first processor 130 to mark the corresponding flight data as failed to upload, and the process may end. In some embodiments, the decryption sub-circuit 14 may control the first processor 130 to extract the random code and to compare the extracted random code with the random code in the transmitted flight data packet. If the random code in the transmission status is identical to the random code in the transmitted flight data packet, S137 is executed. If the random code in the transmission status is different from the random code in the transmitted flight data packet, the feedback sub-circuit 18 may control the first processor 130 to mark the corresponding flight data as failed to upload, and the process may end.

At S137, the corresponding flight data is marked as successfully uploaded. In some embodiments, the feedback sub-circuit 18 may control the first processor 130 to mark the corresponding flight data as successfully uploaded.

At S139, an amount of flight data to be transmitted is updated and the process ends. In some embodiments, the feedback sub-circuit 18 may control the first processor 130 to update the amount of flight data to be transmitted in the aerial vehicle 100. The flight data to be transmitted is also referred to as "un-transmitted flight data."

In some embodiments, based on the amount of the flight data to be transmitted, the controller of the aerial vehicle 100 may constrain or allow the flying of the aerial vehicle 100. In some embodiments, before executing a flying task, the controller of the aerial vehicle 100 may retrieve the amount of the flight data to be transmitted. If the amount of the flight data to be transmitted exceeds a pre-configured value, the aerial vehicle 100 may be prohibited from taking off or from performing a flight task, and the aerial vehicle 100 may be controlled to upload the flight records until the amount of the flight data to be transmitted falls within the pre-configured range.

In some embodiments, the flight data exchanging system S1 may operate as an aerial vehicle regulatory system implemented in an aerial vehicle regulatory platform.

The flight data exchanging system and the flight data exchanging method may encrypt the flight data using an encryption password to secure the flight data during the transmission, avoid the leaking of the flight data contents, and prevent the flight data from being intercepted or tampered during the transmission. In some embodiments, the flight data exchanging system may asymmetrically encrypt the flight data using the aerial vehicle private key and the aerial vehicle public key to further enhance the security and confidentiality of the flight data during the transmission. Moreover, the flight data may be digitally signed using the aerial vehicle private key, hence authenticity can be attached to the flight data and a third party can be prevented from falsifying or forging the flight data. Due to its uniqueness and reliability, the asymmetrical encryption may further prevent the third party from intercepting or tampering the flight data, thereby making the flight data transmission more secure and reliable. In addition, the flight data exchanging system may return the transmission status from the storage terminal to the aerial vehicle, such that the transmission status of the flight data may be recorded and the flight data management may be facilitated.

In some embodiments, S133 may be omitted, the random code may be obtained directly from the decrypted transmission status, and the determination process at S135 may be executed.

Figure 5:
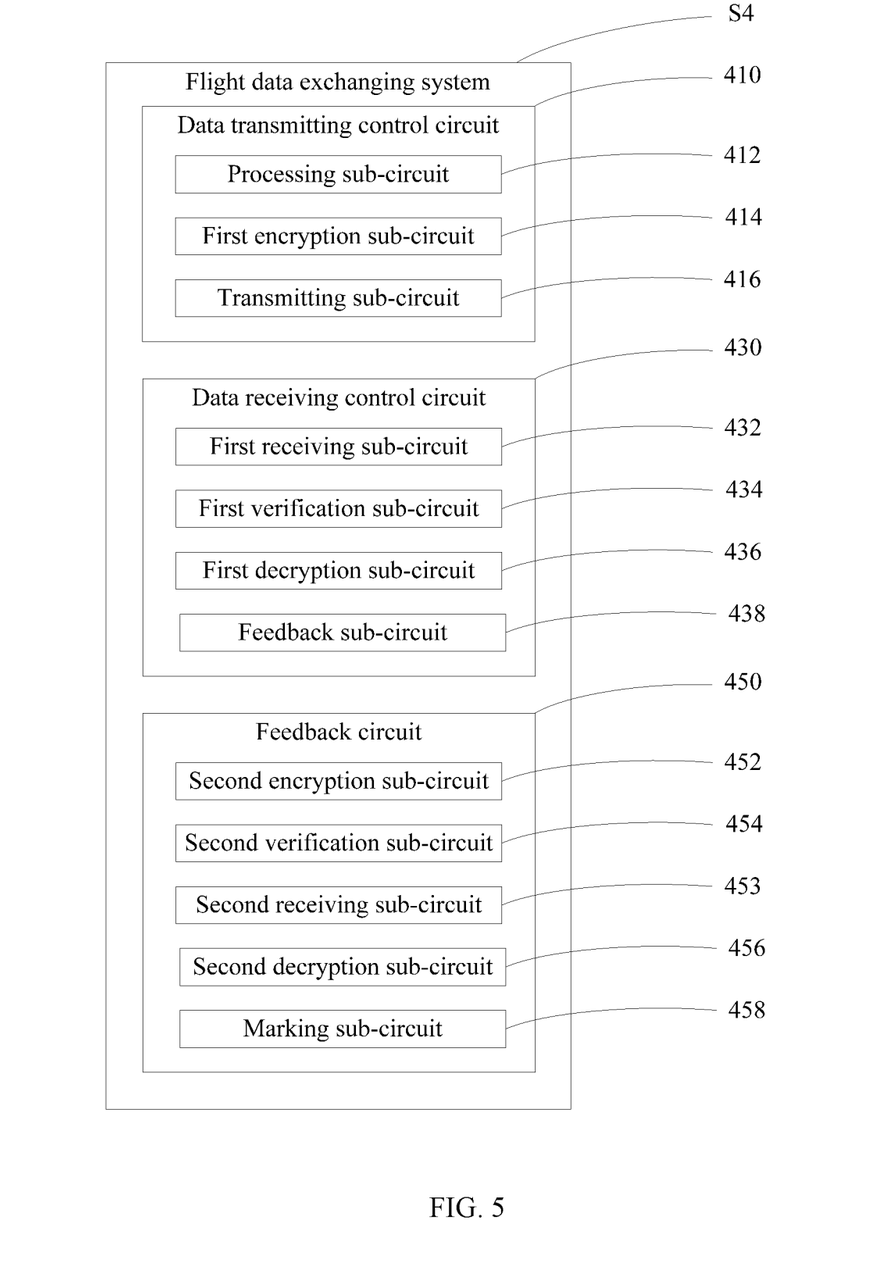
FIG. 5 is a schematic structural diagram of another flight data exchanging system according to an example embodiment.

FIG. 5 is a schematic structural diagram of another flight data exchanging system S4 according to an example embodiment. The flight data exchanging system S4 can be implemented in the aerial vehicle 100, the control terminal 300, and the storage terminal 200 shown in FIG. 2, to transmit data, such as flight records of the aerial vehicle 100, to the storage terminal 200 for data archiving or data management.

In some embodiments, as shown in FIG. 5, the flight data exchanging system S4 includes a data transmitting control circuit 410, a data receiving control circuit 430, and a feedback circuit 450. The data transmitting control circuit 410 may encrypt the flight data and control the aerial vehicle 100 to transmit the flight data. The data receiving control circuit 430 may control the storage terminal 200 to receive the flight data and decrypt the flight data. The data receiving control circuit 430 may also control the storage terminal 200 to return a transmission status of the flight data to the aerial vehicle 100. The feedback circuit 450 may control the aerial vehicle 100 to receive the transmission status of the flight data and mark the corresponding flight data based on the transmission status.

The program codes implementing the functions of the circuits in the flight data exchanging system S4 may be stored in a memory and may be executed by a corresponding processor. In some embodiments, the program codes implementing the functions of the data transmitting control circuit 410 may be stored in the first memory 110 and may be executed by the first processor 130, the first data transmitter 150, and/or the first data receiver 170. The program codes implementing the functions of the feedback circuit 450 may be stored in first memory 110 and/or the second memory 210, and may be executed by the second processor 230, the second data transmitter 250, the first processor 130, and/or the first data receiver 170. The program codes implementing the functions of the data receiving control circuit 430 may be stored in the second memory 210 and may be executed by the second processor 230, the second data transmitter 250, and/or the second data receiver 270.

Details of various circuits of the flight data exchanging system S4 are described below.

The data transmitting control circuit 410 may encrypt the flight data and may control the aerial vehicle 100 to transmit the flight data. In some embodiments, as shown in FIG. 5, the data transmitting control circuit 410 includes a processing sub-circuit 412, a first encryption sub-circuit 414, and a transmitting sub-circuit 416.

The processing sub-circuit 412 may receive a control instruction for transmitting the flight data.

The first encryption sub-circuit 414 may control the first processor 130 to encrypt the flight data, append an aerial vehicle ID and a digital signature of the aerial vehicle 100 to the flight data.

The transmitting sub-circuit 416 may control the first data transmitter 150 to transmit the encrypted flight data.

The data receiving control circuit 430 may control the storage terminal 200 to receive and decrypt the flight data and may control the storage terminal 200 to return the transmission status of the flight data to the aerial vehicle 100. In some embodiments, as shown in FIG. 5, the data receiving control circuit 430 includes a first receiving sub-circuit 432, a first verification sub-circuit 434, a first decryption sub-circuit 436, and a feedback sub-circuit 438.

The first receiving sub-circuit 432 may control the second data receiver 270 to receive the flight data.

The first verification sub-circuit 434 may verify the aerial vehicle ID and the aerial vehicle digital signature in the flight data.

The first decryption sub-circuit 436 may control the second processor 230 to decrypt the flight data.

After the flight data is stored in the second memory 210, the feedback sub-circuit 438 may control the second processor 230 to generate the transmission status and may control the second data transmitter 250 to return the transmission status to the aerial vehicle 100. In some embodiments, the feedback sub-circuit 438 may control the second processor 230 to encrypt the transmission status and append the digital signature of the storage terminal 200 to the transmission status.

The feedback circuit 450 may control the aerial vehicle 100 to receive the transmission status of the flight data and mark the corresponding flight data based on the transmission status. In some embodiments, as shown in FIG. 5, the feedback circuit 450 includes a second encryption sub-circuit 452, a second verification sub-circuit 454, a second receiving sub-circuit 453, a second decryption sub-circuit 456, and a marking sub-circuit 458.

The second decryption sub-circuit 452 may control the second processor 230 to encrypt the transmission status and append the digital signature of the storage terminal 200 to the transmission status. In some embodiments, the second encryption sub-circuit 452 may be omitted. Instead, the feedback sub-circuit 438 may control the second processor 230 to encrypt the transmission status and append the digital signature of the storage terminal 200 to the transmission status.

The second receiving sub-circuit 453 may control the first data receiver 170 to receive the transmission status.

The second verification sub-circuit 454 may control the first processor 130 to verify the digital signature of the storage terminal 200 in the transmission status.

The second decryption sub-circuit 546 may control the first processor 130 to decrypt the transmission status.

The marking sub-circuit 458 may control the first processor 130 to mark the corresponding flight data.

Figure 6:
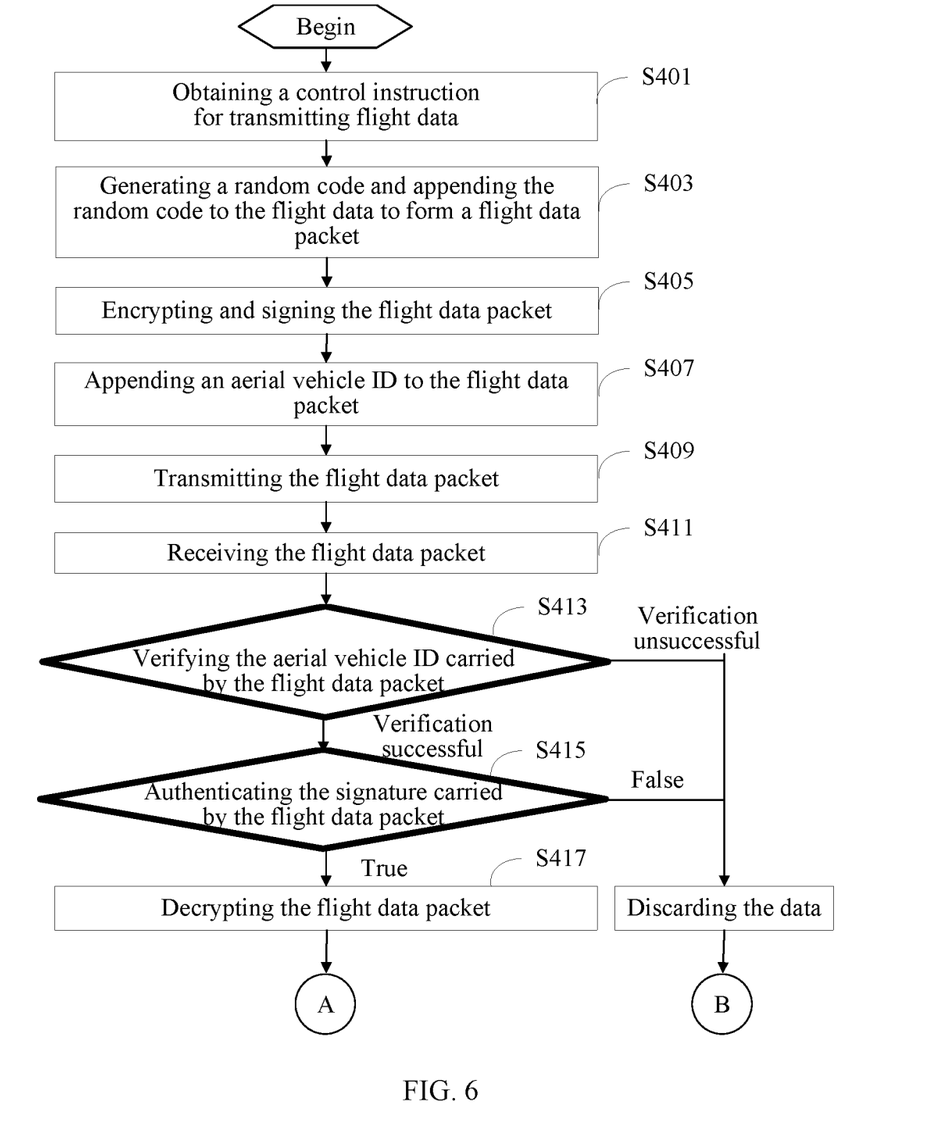
FIG. 6 and FIG. 7 show a flow chart of another flight data exchanging method according to an example embodiment.
Figure 7:
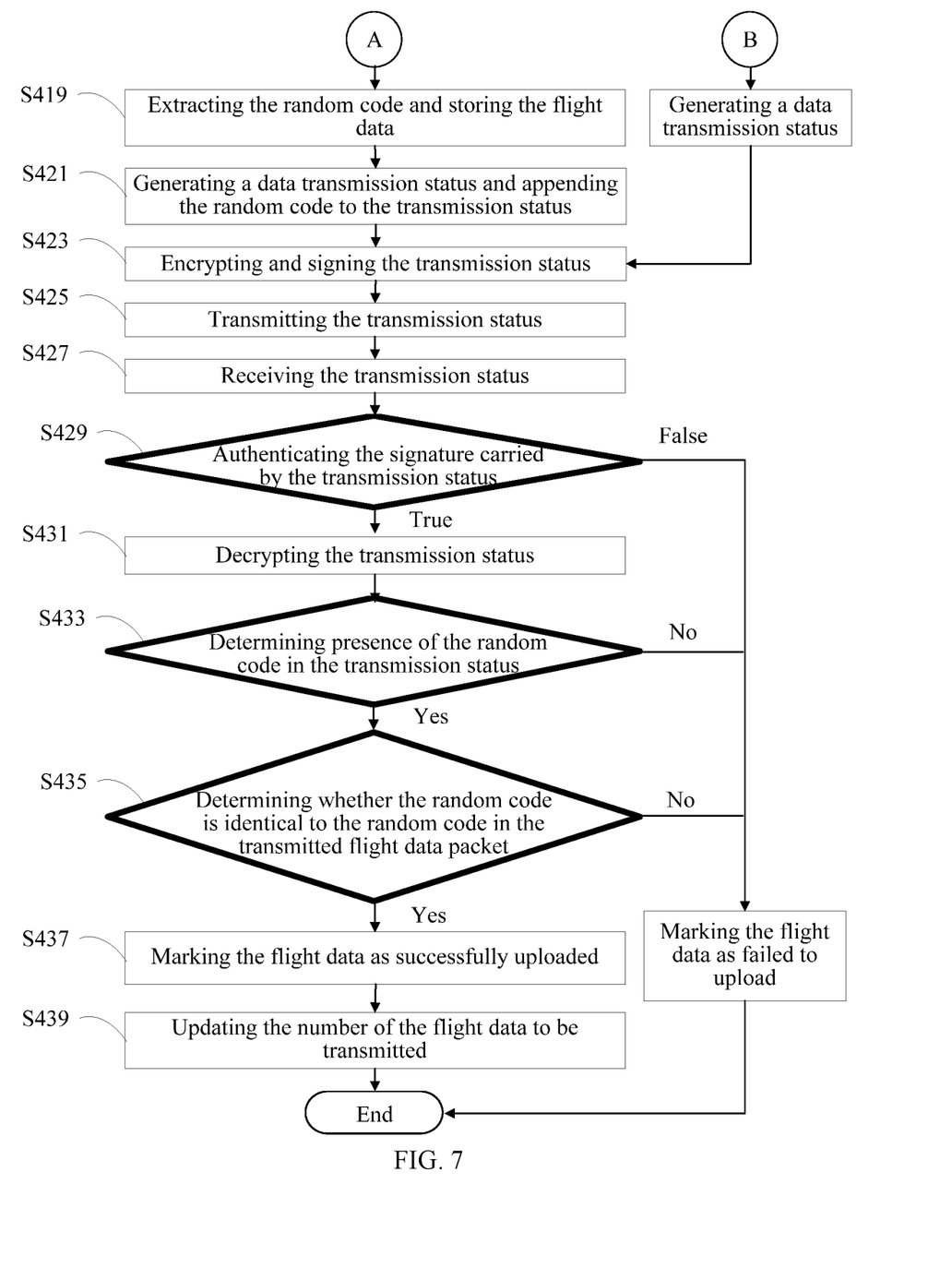

FIG. 6 and FIG. 7 show a flow chart of another flight data exchanging method according to an example embodiment. In some embodiments, the method consistent with the disclosure may be implemented by a processor. The processes and the sequence of the processes in the flow chart shown in FIG. 6 and FIG. 7 are intended to be illustrative, and not to limit the scope of the present disclosure. In some embodiments, one or more of the processes shown in FIG. 6 and FIG. 7 may be deleted and/or re-arranged, and/or additional process may be added. Similar to the flight data exchanging method applied to the flight data exchanging system S1, the flight data exchanging method shown in FIG. 6 and FIG. 7 may be applied to the flight data exchanging system S4 to exchange data between the aerial vehicle 100 and the storage terminal 200.

As shown in FIG. 6, at S401, a control instruction for transmitting flight data is obtained. In some embodiments, the processing sub-circuit 412 of the data transmitting control circuit 410 may control the first processor 130 to obtain the control instruction for transmitting the flight data. The control instruction may be sent by the control terminal 300 or the storage terminal 200. In some embodiments, the control instruction may be generated by the aerial vehicle 100.

At S403, a random code is generated, and the random code is appended to the flight data to form a flight data packet. In some embodiments, the first encryption sub-circuit 414 may control the first processor 130 to generate the random code, and to append the random code to the flight data to form the flight data packet. In some embodiments, the random code may be stored in a random code database. The first encryption sub-circuit 414 may generate the random code by randomly picking one from the random code database. The random code may include a combination of one or more digits, alphabets, and special characters. In some embodiments, the first encryption sub-circuit 414 may generate the random code by using a pre-determined algorithm. The pre-determined algorithm may be any calculation formula pre-configured in the first encryption sub-circuit 414. For example, specific information of the flight data (e.g., size of the data, flight time, flight altitude) may be substituted to the calculation formula to calculate the random code.

The random codes may be stored in the random code database. The first encryption sub-circuit 414 may generate the random code by randomly picking one from the random code database.

In some embodiments, generating the random code and appending the random code to the flight data to form the flight data packet (S403) may be omitted and S405 may be executed after the control instruction for transmitting the flight data is received (S401).

At S405, the flight data packet is encrypted, and a digital signature of the aerial vehicle 100 is appended to the flight data packet. In some embodiments, the first encryption sub-circuit 414 may control the first processor 130 to encrypt the flight data packet and control the first processor 130 to append the digital signature of the aerial vehicle 100 to the flight data packet using the aerial vehicle public key. The flight data packet may be encrypted by using an encryption password. On the other hand, the storage terminal 200 may decrypt the flight data packet using the same encryption password. The encryption method is a symmetrical encryption algorithm.

In some embodiments, appending the digital signature of the aerial vehicle 100 at S405 can be omitted, and only encrypting the flight data packet is executed at S405.

In some embodiments, after the flight data packet is encrypted in S405, the encrypted flight data packet may be further encrypted using an authorization password obtained from the aerial vehicle 100 through the flight data calculation. In some embodiments, after the first encryption sub-circuit 414 controls the first processor 130 to encrypt the flight data packet, the first encryption sub-circuit 414 may further control the first processor 130 to encrypt the flight data packet using the authorization password obtained from the aerial vehicle 100 through the flight data calculation. The authorization password may be a message authentication code (MAC).

At S407, an aerial vehicle identification (also referred to as an "aerial vehicle ID") is appended to the flight data packet. In some embodiments, the first encryption sub-circuit 414 may control the first processor 130 to append the aerial vehicle ID to the encrypted flight data packet.

In some embodiments, appending the aerial vehicle ID to the encrypted flight data packet (S407) may be omitted.

At S409, the flight data packet is transmitted. In some embodiments, the transmitting sub-circuit 416 of the data transmitting control circuit 410 may control the first data transmitter 150 of the aerial vehicle 100 to transmit the flight data packet.

At S411, the flight data packet is received. In some embodiments, the first receiving sub-circuit 432 of the data receiving control circuit 430 may control the second data receiver 270 of the storage terminal 200 to receive the flight data packet.

As shown in FIG. 6, at S413, the aerial vehicle ID carried by the flight data packet is verified. If the verification is successful, S415 is executed. If the verification is unsuccessful, a transmission status indicating transmission failure is generated, and S423 is executed (shown in FIG. 7). In some embodiments, when verifying the aerial vehicle ID, the first verification sub-circuit 434 may control the second processor 230 to look up and match the aerial vehicle ID in the aerial vehicle IDs stored in the second memory 210. If the aerial vehicle ID carried by the flight data packet is found in the aerial vehicle IDs stored in the second memory 210, the match is successful, the verification is successful, and S415 is executed. If the aerial vehicle ID carried by the flight data packet is not found in the aerial vehicle IDs stored in the second memory 210, the match is unsuccessful, the flight data may be discarded, a transmission status indicating transmission failure is generated, and S423 is executed.

In some embodiments, when S407 is omitted, S413 may also be omitted.

At S415, the authenticity of the digital signature carried by the flight data packet is verified. If the digital signature is true, S417 is executed. If the digital signature is false, the transmission status indicating transmission failure is generated, and S423 is executed. In some embodiments, the first verification sub-circuit 434 may control the second processor 230 to verify and decrypt the digital signature carried by the flight data packet using the aerial vehicle public key stored in the second memory 210. If the verification is successful, the digital signature carried by the flight data packet is authenticated, and S417 is executed. If the verification is unsuccessful, the digital signature carried by the flight data packet is not authenticated, the flight data may be discarded, the transmission status indicating transmission failure is generated, and S423 is executed.

In some embodiments, if the digital signature of the aerial vehicle 100 is not appended to the flight data packet at S405, S415 may be omitted.

In some embodiments, if the flight data packet is further encrypted using the authorization password after the flight data packet is encrypted in S405, verifying the digital signature may be omitted at S415, and the authorization password of the flight data packet may be decrypted. In some embodiments, the first verification sub-circuit 434 may control the second processor 230 to decrypt the flight data by calculating the message authentication code (MAC). If the decryption is successful, S417 is executed. If the decryption is unsuccessful, the transmission status indicating transmission failure is generated, and S423 is executed.

At S417, the flight data packet is decrypted. In some embodiments, the first decryption sub-circuit 436 may control the second processor 230 to decrypt the flight data using the encryption password.

At S419, a random code is extracted, and the flight data are stored. In some embodiments, the first decryption sub-circuit 436 may control the second processor 230 to extract the random code from the flight data and store the flight data in the second memory 210.

At S421, a transmission status of the flight data is generated, and the random code is appended to the transmission status. In some embodiments, the feedback sub-circuit 18 may control the second processor 230 to generate the transmission status indicating transmission success and to append the random code to the transmission status. In some embodiments, S421 may be performed by the second encryption sub-circuit 452 of the feedback circuit 450.

At S423, the transmission status is encrypted, and a digital signature of the storage terminal 200 is appended to the transmission status. In some embodiments, the second encryption sub-circuit 452 may control the second processor 230 to encrypt the transmission status and may control the second processor 230 to append the digital signature of the storage terminal 200 to the transmission status using the aerial vehicle public key. The transmission status may be encrypted by an encryption password. The encrypted transmission status may be decrypted by the aerial vehicle 100 using the same encryption password. The encryption method may be a symmetrical algorithm.

In some embodiments, the transmission status may be encrypted without appending the digital signature of the storage terminal 200 to the transmission status in S423.

In some embodiments, after the transmissions status is encrypted at S423, the transmission status may be further encrypted using an authorization password obtained from the storage terminal 200 through the transmission status calculation. In some embodiments, after the second encryption sub-circuit 452 controls the second processor 230 to encrypt the transmission status, the second encryption sub-circuit 452 may further control the second processor 230 to further encrypt the transmission status using the authorization password obtained by the storage terminal 200 through the transmission status calculation. The authorization password may include a message authentication code (MAC).

In some embodiments, S423 may be performed by the feedback sub-circuit 438 of the data receiving control circuit 430.

At S425, the transmission status is transmitted. In some embodiments, the feedback sub-circuit 438 of the data receiving control circuit 430 may control the second data transmitter 250 of the aerial vehicle 100 to transmit the transmission status.

At S427, the transmission status is received. In some embodiments, the second receiving sub-circuit 453 of the feedback circuit 450 may control the first data receiver 170 of the aerial vehicle 100 to receive the transmission status.

At S429, the authenticity of the digital signature carried by the transmission status is verified. If the digital signature is true, S431 is executed. If the digital signature is false, the marking sub-circuit 458 may control the first processor 130 to mark the corresponding flight data as failed to upload, and the process may end. In some embodiments, the second verification sub-circuit 454 may control the first processor 130 to authenticate and decrypt the digital signature carried by the transmission status using the storage terminal public key stored in the first memory 110. If the verification is successful, the digital signature carried by the transmission status may be authenticated, and S431 is executed. If the verification is unsuccessful, the digital signature carried by the transmission status may not be authenticated, the marking sub-circuit 458 may control the first processor 130 to mark the corresponding flight data as failed to upload, and the process may end.

In some embodiments, if the digital signature of the storage terminal 200 is not appended to the transmission status at S423, S429 may be omitted.

In some embodiments, if the transmission status is further encrypted using an authorization password obtained from the storage terminal 200 through the transmission status calculation after the transmissions status is encrypted in S423, verifying the authenticity of the digital signature at S429 may be omitted and the transmission status may be decrypted using the authorization password. In some embodiments, the second verification sub-circuit 454 may control the first processor 130 to decrypt the transmission status by calculating the message authentication code (MAC). If the decryption is successful, S431 is executed. If the decryption is unsuccessful, the marking sub-circuit 458 may control the first processor 130 to mark the corresponding flight data as failed to upload, and the process may end.

At S431, the transmission status is decrypted. In some embodiments, the second decryption sub-circuit 456 may control the first processor 130 to decrypt the transmission status using the encryption password.

At S433, the presence of the random code in the transmission status is determined. If present, S435 is executed. If the random code is absent, the marking sub-circuit 458 may control the first processor 130 to mark the corresponding flight data as failed to upload, and the process may end. In some embodiments, the second decryption sub-circuit 456 may control the first processor 130 to determine the presence of the random code in the transmissions status. If the random code is present, S435 is executed. If the random code is absent, the marking sub-circuit 458 may control the first processor 130 to mark the corresponding flight data as failed to upload, and the process may end.

At S435, the random code is extracted and whether the extracted random code is identical to the random code in the transmitted flight data packet is determined. If the random code extracted from the transmission status is identical to the random code in the transmitted flight data packet, S437 is executed. If the random code extracted from the transmission status is not identical to the random code in the transmitted flight data packet, the marking sub-circuit 458 may control the first processor 130 to mark the corresponding flight data as failed to upload, and the process may end. In some embodiments, the second decryption sub-circuit 456 may control the first processor 130 to extract the random code and to compare the extracted random code with the random code in the transmitted flight data packet. If the random code in the transmission status is identical to the random code in the transmitted flight data packet, S437 is executed. If the random code in the transmission status is different from the random code in the transmitted flight data packet, the marking sub-circuit 458 may control the first processor 130 to mark the corresponding flight data as failed to upload, and the process may end.

At S437, the corresponding flight data is marked as successfully uploaded. In some embodiments, the marking sub-circuit 458 may control the first processor 130 to mark the corresponding flight data as successfully uploaded.

At S439, the amount of flight data to be transmitted is updated and the process ends. In some embodiments, the marking sub-circuit 458 may control the first processor 130 to update the amount of flight data to be transmitted in the aerial vehicle 100. The flight data to be transmitted is also referred to as "un-transmitted flight data".

In the disclosed embodiments, the data transmitting circuit 410 may be an independent data transmitting system implemented in a data transmitting device such that the data transmitting device may transmit data to an external apparatus. The data transmitting device may be, for example, an aerial vehicle terminal, an aerial vehicle controller, a remote-control terminal, or an aerial vehicle regulatory platform.

The data receiving circuit 430 consistent with the disclosure may function as an independent data receiving system implemented in a data receiving device to allow the data receiving device to receive data from an external apparatus. The data receiving device may include, for example, an aerial vehicle regulatory platform, an aerial vehicle terminal, an aerial vehicle controller, or a remote control terminal.

It should be understood that the flight data exchanging system and method consistent with the disclosure not only can be implemented in an aerial vehicle and/or a storage terminal as described above, but also can be implemented in another mobile terminal or storage terminal, such as, for example, an aerial vehicle terminal, an aerial vehicle controller, a remote-control terminal, an aerial vehicle regulatory platform, or a data server.

Those of ordinary skill in the art will appreciate that the example elements and algorithm steps described above can be implemented in electronic hardware, or in a combination of computer software and electronic hardware. Whether these functions are implemented in hardware or software depends on the specific application and design constraints of the technical solution. One of ordinary skill in the art can use different methods to implement the described functions for different application scenarios, but such implementations should not be considered as beyond the scope of the present disclosure. For simplification purposes, detailed descriptions of the operations of example systems, devices, and units may be omitted and references can be made to the descriptions of the example methods.

The disclosed systems, apparatuses, and methods may be implemented in other manners not described here. For example, the devices described above are merely illustrative. For example, the division of units may only be a logical function division, and there may be other ways of dividing the units. For example, multiple units or components may be combined or may be integrated into another system, or some features may be ignored, or not executed. Further, the coupling or direct coupling or communication connection shown or discussed may include a direct connection or an indirect connection or communication connection through one or more interfaces, devices, or units, which may be electrical, mechanical, or in other form.

The units described as separate components may or may not be physically separate, and a component shown as a unit may or may not be a physical unit. That is, the units may be located in one place or may be distributed over a plurality of network elements. Some or all of the components may be selected according to the actual needs to achieve the object of the present disclosure. In addition, the functional units in the various embodiments of the present disclosure may be integrated in one processing unit, or each unit may be an individual physically unit, or two or more units may be integrated in one unit.

A method consistent with the disclosure can be implemented in the form of computer program stored in a non-transitory computer-readable storage medium, which can be sold or used as a standalone product. The computer program can include instructions that enable a computer device, such as a processor, a personal computer, a server, or a network device, to perform part or all of a method consistent with the disclosure, such as one of the example methods described above. The storage medium can be any medium that can store program codes, for example, a USB disk, a mobile hard disk, a read-only memory (ROM), a random access memory (RAM), a magnetic disk, or an optical disk.

Other embodiments of the disclosure will be apparent to those skilled in the art from consideration of the specification and practice of the embodiments disclosed herein. It is intended that the specification and examples be considered as example only and not to limit the scope of the disclosure, with a true scope and spirit of the invention being indicated by the following claims.

What is claimed is:

1. A flight data exchanging method comprising:
   receiving a control instruction for transmitting flight data of an aerial vehicle;
   encrypting the flight data;
   transmitting the flight data to a server;
   receiving a transmission status of the flight data from the server;
   updating an amount of un-transmitted flight data based on the transmission status; and
   prohibiting the aerial vehicle from performing a flight task in response to the amount of un-transmitted flight data exceeding a pre-configured value.

2. The method of claim 1, further comprising:
   marking the flight data based on the transmission status.

3. The method of claim 1, further comprising:
   appending an aerial vehicle ID to the flight data after encrypting the flight data.

4. The method of claim 3, wherein:
   the transmission status indicates a transmission failure determined based on the aerial vehicle ID.

5. The method according to claim 4, wherein:
   the transmission status indicates the transmission failure in response to the aerial vehicle ID not matching to a plurality of aerial vehicle IDs stored in a memory device.

6. The method of claim 1, further comprising:
   before encrypting the flight data, generating a random code and appending the random code to the flight data.

7. The method of claim 6,
   wherein:
   the random code is a first random code; and
   the transmission status includes a second random code;
   the method further comprising:
   marking the flight data based on the transmission status.

8. The method of claim 7, further comprising:
   extracting the second random code from the transmission status;
   comparing the second random code with the first random code; and
   marking the flight data as being:
   successfully transmitted in response to the second random code matching the first random code; or
   failed to be transmitted in response to the second random code not matching the first random code.

9. The method of claim 6, further comprising:
   storing a plurality of pre-determined random codes in a random code database;
   wherein generating the random code includes randomly picking one of the pre-determined random codes from the random code database as the random code.

10. The method of claim 1,
    wherein:
    the transmission status is encrypted using an authorization password obtained through transmission status calculation; and
    the transmission status carries a digital signature added using a server private key;
    the method further comprising:
    verifying the digital signature carried by the transmission status using a server public key.

11. The method of claim 10,
wherein the authorization password includes a message authorization code;
the method further comprising:
  decrypting the transmission status through calculating the message authorization code.

12. The method of claim 1, further comprising:
after encrypting the flight data, digitally signing the flight data using an aerial vehicle private key;
wherein the transmission status is generated based on a verification of a digital signature of the flight data using an aerial vehicle public key.

13. The method of claim 1, further comprising:
after encrypting the flight data, further encrypting the flight data using an authorization password obtained through flight data calculation.

14. The method of claim 1, further comprising:
sequentially uploading the un-transmitted flight data until the amount of un-transmitted flight data falls within a pre-configured range.

15. An aerial vehicle comprising:
a functional component; and
an aerial vehicle controller coupled to the functional component and including:
  a processor configured to:
    receive a control instruction for transmitting flight data of the aerial vehicle;
    encrypt the flight data;
    transmit the flight data to a server;
    receive a transmission status of the flight data from the server;
    update an amount of un-transmitted flight data based on the transmission status; and
    prohibit the aerial vehicle from performing a flight task in response to the amount of un-transmitted flight data exceeding a pre-configured value.

16. The aerial vehicle of claim 15, wherein:
the functional component includes at least one of a flight controller, an electronic regulator, a stabilizer, or a remote controller.

17. The aerial vehicle of claim 15, wherein the processor is further configured to:
sequentially upload the un-transmitted flight data until the amount of un-transmitted flight data falls within a pre-configured range.

18. The aerial vehicle of claim 15, wherein the processor is further configured to:
mark the flight data based on the transmission status returned from the server after the aerial vehicle transmits the flight data.

\* \* \* \* \*